United States Patent Office 2,795,983
Patented June 18, 1957

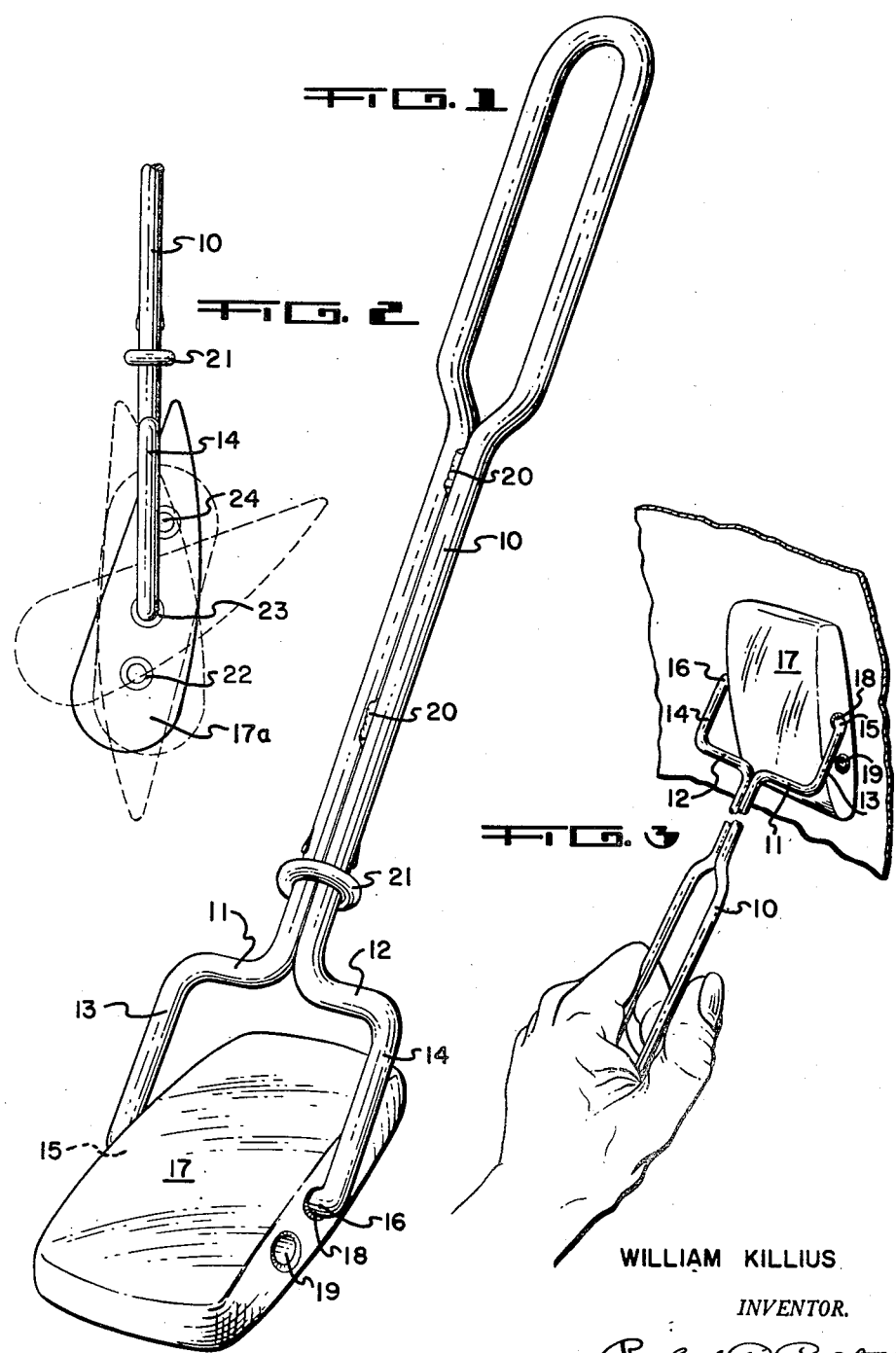

2,795,983
SWIVEL DOLLY BLOCK

William Killius, Altadena, Calif.

Application July 12, 1954, Serial No. 442,479

1 Claim. (Cl. 81—15)

This invention relates to a swivel dolly block for use in the repair and straightening of automobile bodies, fenders and other objects made of sheet metal.

In the past, it has been customary to use a dolly block which is rigidly attached to the end of a handle. The block is placed on one side of the body, fender or metal plate, while the other side is struck a series of sharp blows in order to remove dents and other irregularities in the surface of the metal. With present day automobiles, such a device is unsatisfactory because it is often impossible to insert and hold the dolly block at such an angle that it presents the proper backing surface.

It is an object of my invention to provide a dolly block which is swivel mounted on the end of the handle. In this way, the handle can be inserted at whatever angle is available or possible to achieve and yet the block can be positioned and held at the proper angle with respect to the metal surface. In this way, my swivel dolly block can be used in many places where a rigidly mounted dolly block would be impossible or unsatisfactory to use.

It is a further object of my invention to provide such a device in which the dolly block is removable and changeable, so that a dolly block of the desired contour may be used for each job. For example, removing a dent from a flat piece of metal calls for a substantially flat dolly block, while removing a dent from a sharply curved piece of metal requires a sharply curved dolly block, the contours of which correspond to the contours of the metal piece being straightened. With my invention, a plurality of dolly blocks of various shapes and sizes are provided and are easily changed in order to provide a single tool which can be used for every job.

Another object of my invention is to provide a dolly block which is provided with two or more pivotal mounting means together with a mounting frame which is disposed adjacent the dolly block. When the dolly block is mounted off-center or when the dolly block is larger than the distance between the pivot points and the frame, it swivels to a position where one end of the dolly block is supported by the frame. It thus provides a large area which can be struck without disturbing the positioning of the dolly block.

It is among the objects of my invention to provide a dolly block which is more useful and versatile than those previously in use and which may be manufactured economically.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a front perspective view of a preferred embodiment of my invention;

Fig. 2 is an end view of the dolly block portion of my device, showing another form of dolly block;

Fig. 3 is a broken perspective view of my device in use.

A preferred embodiment which has been selected to illustrated my invention comprises an elongated handle 10, which is preferably formed from a single piece of metal bent back upon itself to form two substantially parallel members. The parallel members forming handle 10 diverge at their free ends to form a pair of right angle portions 11 and 12, which extend in opposite directions from handle 10. Right angle portions 11 and 12 terminate at another right angle to form a pair of arms 13 and 14, which extend substantially parallel to each other and to handle 10. Arms 13 and 14 terminate at another right angle to form a pair of short holding members 15 and 16, which extend substantially parallel to right angle portions 11 and 12.

A dolly block 17, which comprises a substantially rectangular piece of metal slightly rounded on each of its larger sides is provided with a pair of center holes 18 which are centrally disposed on the opposite small sides of dolly block 17. Holding members 15 and 16 extend into center holes 18 to hold dolly block 17 in a swivel mounting with respect to handle 10. Dolly block 17 is also provided with a pair of offset holes 19, which are aligned on opposite sides of dolly block 17 between center holes 18 and one end of dolly block 17.

The parallel members which form handle 10 are securely attached to each other by welding 20 or other suitable means. They diverge slightly at their closed end to form a wider portion which is adapted to be gripped by the hand of the user.

A ring 21 encircles handle 10 adjacent right angle portions 11 and 12. Ring 21 is slidably mounted on handle 10 and can be moved toward the closed end of handle 10. When ring 21 is so moved, arms 13 and 14 can be moved away from each other in order to free holding members 15 and 16 from holes 18 and 19 and remove dolly block 17. Dolly block 17 can be moved or replaced with another dolly block and ring 21 moved down to a point adjacent right angle portions 11 and 12 to prevent the separation of the parallel members forming handle 10 and thus prevent movement of holding members 15 and 16 with respect to each other.

In addition to a flat dolly block 17 such as that shown in Figs. 1 and 3, I may provide a tier shaped dolly block 17a, which presents different curves and shapes for working on different contours of metal objects. Other dolly blocks of other shapes and contours may also be provided in order to make my device so versatile that it can be used for any job.

Dolly block 17a is provided with three pairs of holes 22, 23 and 24, which are aligned on opposite sides of dolly block 17a. It is possible to swing dolly block 17a to a position where its large or narrow end is disposed above and supported by right angle portions 11 and 12. For example, when holding members 15 and 16 are disposed in holes 23, dolly block 17a can be swung to the position shown in full lines in Fig. 2, wherein its narrow end overlies right angle portions 11 and 12 and it presents a rounded contour on one side of my device. If dolly block 17a is swung around the other way, as shown in dotted lines in Fig. 2, its narrow end again overlies right angle portions 11 and 12, but it presents a substantially flat contour on the opposite side of my device.

If holding members 15 and 16 are moved to holes 24, the rounded end of dolly block 17a can be swung to a position where it overlies right angle portions 11 and 12. It may be noted that whenever one end of dolly block 17a is supported by right angle portions 11 and 12, another portion of dolly block 17a is supported by holding members 15 and 16. Dolly block 17a can then be struck at either point of support or at any place in between without being pivoted or moved out of position. In this way, a rigid dolly block can be provided if desired.

The same spaced support and rigidity of dolly block 17 can be obtained by moving holding members 15 and 16 to holes 19 and swinging dolly block 17 to a position where one end overlies right angle portions 11 and 12. It is thus possible to achieve with my device all of the advantages of both a swivel mounted and rigidly mounted dolly block.

The sides of handle 10 are provided with a pair of small projections which extend outwardly to prevent ring 21 from accidentally moving toward the closed end of handle 10. When the parallel members forming handle 10 are manually moved together, ring 21 can be passed over the projections to permit removal of the dolly block.

I claim:

A device comprising a handle having means adjacent one end thereof for manually gripping said handle, said handle having at its opposite end a pair of right angle portions extending outwardly from said handle in opposite directions, each of said right angle portions having an arm, said arms having inwardly directed free ends, a dolly block having a plurality of means on each side thereof for pivotally mounting said dolly block on the free ends of said arms, the distance between one of said mounting means and the ends of said dolly block being less than the distance between said mounting means and said right angle portions so that said dolly block may be freely rotatably mounted, the distance between another of said mounting means and the end of said dolly block being greater than the distance between said mounting means and said right angle portions, so that said dolly block is adapted to be pivoted to a position wherein it overlies and is supported by said right angle portions to provide a second support for said dolly block spaced from said arms, whereby said dolly block may be struck at any place between said spaced supports without disturbing its positioning.

References Cited in the file of this patent

UNITED STATES PATENTS

| 856,733 | Saffold | June 11, 1907 |
| 1,530,842 | Matoushek | Mar. 24, 1925 |
| 2,599,489 | Schmidt | June 3, 1952 |
| 2,605,659 | Ostrenga | Aug. 5, 1952 |